(12) United States Patent
Weisser, Jr.

(10) Patent No.: US 11,533,784 B2
(45) Date of Patent: Dec. 20, 2022

(54) HOT FOOD MERCHANDISING UNIT WITH ROLLER GRILL

(71) Applicant: Sanden Vendo America, Inc., Dallas, TX (US)

(72) Inventor: Michael J. Weisser, Jr., Wylie, TX (US)

(73) Assignee: Sanden Vendo America, Inc., Dallas, TX (US)

( * ) Notice: Subject to any disclaimer, the term of this patent is extended or adjusted under 35 U.S.C. 154(b) by 622 days.

(21) Appl. No.: 16/581,605

(22) Filed: Sep. 24, 2019

(65) Prior Publication Data

US 2021/0092799 A1  Mar. 25, 2021

(51) Int. Cl.
*A47J 36/02* (2006.01)
*A47J 37/04* (2006.01)
(Continued)

(52) U.S. Cl.
CPC ........... *H05B 3/0095* (2013.01); *A47F 3/001* (2013.01); *A47F 3/08* (2013.01); *A47F 7/0071* (2013.01);
(Continued)

(58) Field of Classification Search
None
See application file for complete search history.

(56) References Cited

U.S. PATENT DOCUMENTS 538,145 A    4/1895 Mien
778,872 A    1/1905 Lugosch
(Continued)

FOREIGN PATENT DOCUMENTS

EP    2045785 A2    4/2009
JP    4663307 B2 *  4/2011
(Continued)

OTHER PUBLICATIONS

JP4663307B2 (=2006158805A), Saito et al, Jun. 2006, partial translation.*

(Continued)

*Primary Examiner* — Joseph M. Pelham
(74) *Attorney, Agent, or Firm* — Sierra IP Law, PC; Mark D. Miller

(57) ABSTRACT

The present invention provides single units that contain a large lower chamber, and one or more display shelves above this chamber on the inside of the unit. A roller grill or other large appliance may be provided in the lower chamber, or the chamber may be left open to display large food products or other items. The shelves may be heated for keeping foods displayed on the shelves warm; however, the shelves need not be heated for food products that do not need to be kept warm. Heating elements, lights and sensors may be adjusted using electronic controls to provide optimum temperatures inside the various chambers of the display units. Display units of the present invention allow store owners to utilize the space above a roller grill or other appliance to merchandise additional food products as opposed to requiring a separate food merchandiser to occupy additional valuable counter space. The performance of the roller grills of the present invention is improved over stand-alone roller grills, thereby reducing the potential for lost sales due to food not being sufficiently heated.

18 Claims, 6 Drawing Sheets

(51) Int. Cl.
  *A47F 3/022*  (2006.01)
  *A47F 3/08*   (2006.01)
  *A47F 7/00*   (2006.01)
  *H05B 3/00*   (2006.01)
  *H05B 1/02*   (2006.01)
  *A47J 36/24*  (2006.01)
  *A47F 3/00*   (2006.01)
  *A47J 37/06*  (2006.01)

(52) U.S. Cl.
  CPC ......... *A47J 36/2488* (2013.01); *A47J 37/048* (2013.01); *A47J 37/0629* (2013.01); *H05B 1/02* (2013.01); *H05B 3/0033* (2013.01); *A47J 36/2483* (2013.01); *H05B 2203/028* (2013.01)

(56) References Cited

U.S. PATENT DOCUMENTS

| | | | |
|---|---|---|---|
| 946,337 A | 1/1910 | Clear | |
| 2,218,444 A | 10/1940 | Vineyard | |
| 2,576,874 A | 11/1951 | Acton | |
| 2,583,118 A | 1/1952 | Porambo | |
| 2,584,489 A | 2/1952 | Morrison | |
| 2,648,583 A | 8/1953 | Teach | |
| 3,030,486 A | 4/1962 | Lashley | |
| 3,545,832 A | 12/1970 | Levenback | |
| 3,610,885 A * | 10/1971 | Zingg | A47J 37/0676 |
| | | | 99/332 |
| 3,911,248 A | 10/1975 | Buday et al. | |
| 4,044,980 A | 8/1977 | Cummins | |
| 4,067,265 A | 1/1978 | Watson | |
| 4,191,296 A | 3/1980 | Morgan | |
| 4,250,955 A | 2/1981 | Plattner et al. | |
| 4,332,189 A * | 6/1982 | Stuck | A47J 27/18 |
| | | | 99/441 |
| 4,531,646 A | 7/1985 | Howard | |
| 4,598,828 A | 7/1986 | Young | |
| 4,651,883 A | 3/1987 | Gulett et al. | |
| 4,685,574 A | 8/1987 | Young | |
| 4,927,051 A | 5/1990 | Falk et al. | |
| 5,203,255 A | 4/1993 | Wells et al. | |
| 5,360,134 A | 11/1994 | Falk et al. | |
| 5,404,935 A | 4/1995 | Liebermann | |
| 5,487,474 A | 1/1996 | Heimendinger | |
| 5,590,796 A | 1/1997 | Herman | |
| 5,730,068 A | 3/1998 | Rioux, Jr. | |
| 5,799,822 A | 9/1998 | Rudewicz et al. | |
| 6,011,243 A | 1/2000 | Arnold et al. | |
| 6,102,162 A | 8/2000 | Teicher | |
| 6,105,797 A | 8/2000 | Haisma | |
| 6,111,224 A * | 8/2000 | Witt | H05B 3/00 |
| | | | 219/214 |
| 6,124,572 A | 9/2000 | Spilger et al. | |
| 6,131,399 A | 10/2000 | Hall | |
| 6,259,065 B1 * | 7/2001 | Hohler | A47J 36/2483 |
| | | | 219/400 |
| 6,321,663 B1 | 11/2001 | Rogers | |
| 6,354,193 B1 * | 3/2002 | Lee | A47J 37/0629 |
| | | | 99/441 |
| 6,658,994 B1 * | 12/2003 | McMillan | A47F 3/001 |
| | | | 219/214 |
| 6,686,563 B1 | 2/2004 | Pearlman et al. | |
| 6,707,015 B2 | 3/2004 | Huegerich et al. | |
| 6,752,475 B2 | 6/2004 | Steadman | |
| 6,789,392 B1 | 9/2004 | Miller et al. | |
| 6,837,150 B2 | 1/2005 | Backus et al. | |
| 6,990,821 B2 | 1/2006 | Singh et al. | |
| D569,380 S | 5/2008 | Beilstein | |
| 7,520,211 B2 | 4/2009 | Hunot et al. | |
| 8,063,735 B2 | 11/2011 | Shoenfeld | |
| 8,499,683 B2 | 8/2013 | Shei | |
| 8,544,808 B2 | 10/2013 | Saad | |
| 8,978,223 B1 * | 3/2015 | Archer, Jr. | B29C 35/02 |
| | | | 29/280 |
| 9,153,147 B2 | 10/2015 | Fenton | |
| 9,877,436 B1 | 1/2018 | Taylor | |
| 10,048,457 B2 | 10/2018 | Gagne | |
| 10,359,187 B2 * | 7/2019 | Scanlon | A47J 36/2488 |
| 10,520,199 B2 * | 12/2019 | Polster | A47J 37/0641 |
| 10,900,655 B2 * | 1/2021 | Scanlon | F21V 33/0092 |
| 11,229,320 B2 * | 1/2022 | Chen | A47J 36/32 |
| 2002/0005686 A1 | 1/2002 | Nuttall et al. | |
| 2003/0000935 A1 * | 1/2003 | Roehr | A47J 39/00 |
| | | | 219/385 |
| 2007/0138167 A1 * | 6/2007 | Friedman | A47F 3/001 |
| | | | 219/544 |
| 2008/0169735 A1 | 7/2008 | Yamazaki | |
| 2008/0205042 A1 * | 8/2008 | Shibusawa | A47F 3/001 |
| | | | 362/125 |
| 2009/0025707 A1 * | 1/2009 | Skender | A47J 37/048 |
| | | | 126/41 B |
| 2009/0277199 A1 | 11/2009 | Manas et al. | |
| 2011/0056412 A1 | 3/2011 | Grammer | |
| 2012/0097046 A1 * | 4/2012 | Jones | A47J 37/0629 |
| | | | 99/334 |
| 2012/0176245 A1 | 7/2012 | Paydar et al. | |
| 2012/0203377 A1 | 8/2012 | Paydar et al. | |
| 2012/0212941 A1 * | 8/2012 | Reschreiter | A47J 36/2488 |
| | | | 362/183 |
| 2014/0292168 A1 * | 10/2014 | Nevarez | A47F 11/10 |
| | | | 219/214 |
| 2015/0230631 A1 * | 8/2015 | Nuttall | A47F 3/0439 |
| | | | 312/236 |
| 2017/0156545 A1 | 6/2017 | Davis | |
| 2017/0325629 A1 * | 11/2017 | Scanlon | F21V 29/83 |
| 2019/0110611 A1 | 4/2019 | Hieb et al. | |
| 2019/0208956 A1 * | 7/2019 | Chen | A47J 37/048 |
| 2019/0323700 A1 * | 10/2019 | Scanlon | F21V 33/0092 |
| 2020/0128972 A1 * | 4/2020 | Griggs | F21V 29/67 |
| 2020/0237117 A1 * | 7/2020 | De La Vega | A47F 3/001 |
| 2020/0367694 A1 * | 11/2020 | Steele | A47F 3/0447 |
| 2021/0038018 A1 * | 2/2021 | Hundley | A47J 36/2483 |
| 2021/0330097 A1 * | 10/2021 | Kurmlavage | A47F 3/0447 |
| 2022/0071442 A1 * | 3/2022 | Kurmlavage | A47J 36/06 |

FOREIGN PATENT DOCUMENTS

| | | | |
|---|---|---|---|
| JP | 2014117448 A | * | 6/2014 |
| JP | 2014210046 A | * | 11/2014 |
| NL | 1024563 C2 | | 4/2005 |

OTHER PUBLICATIONS

Klinkers, Frans J., Vending machine for hot or cold food products, blocks compartment door when product inside is no longer fresh, English Abstract of Netherlands Patent Publication NL 1024563, Apr. 20, 2005, European Patent Organization, http://www.epo.org/searching/free/espacenet.html.

Proposed Revisions to the NAMA Construction Standard for Unattended Location Refrigerated Display Cases used in Micro Markets, AMHIC Meeting, Apr. 26, 2013.

* cited by examiner

HOT FOOD MERCHANDISING UNIT WITH ROLLER GRILL

FIELD OF THE INVENTION

The present invention relates to merchandising and display devices for hot foods, and more particularly to improved hot food display and merchandising units having one or more upper shelves that may be heated located above a lower chamber that may be empty or house an optional roller grill or other appliance, and related methods.

BACKGROUND OF THE INVENTION

Hot food merchandiser cases are a common type of equipment used by grocery stores, convenience stores, and other retail and food service providers to display foods for sale to consumers and shoppers. Different types of hot food require different types of hot display. For example, freshly baked items such as pizza, chicken wings, burritos or tacos may be displayed on a flat shelf, and the items may be kept warm by providing heating in the shelf itself, or by providing overhead heating lamps above the shelf, or both. Similarly, other freshly baked items such as cookies, cakes, pies, rolls or pastries may also be displayed on such shelves. On the other hand, certain hot foods, such as hot dogs, sausage, or taquitos are more advantageously displayed on a roller grill where they may be cooked and may also be kept warm after cooking.

However, a roller grill is not a suitable place for flat bottomed or flat sided items such as pizza or pastry, since the continued rolling motion would cause the item to roll off the grill onto the floor. Similarly, a warming shelf is not an optimal location for the display of freshly cooked hot dogs, sausage since or other cylindrical foods since these items may be more evenly cooked and kept warm as they are turned between the rollers of a roller grill. As a result, flat-bottomed or flat-sided foods and cylindrical foods are generally not displayed in the same case. Instead, if both kinds of foods are offered, they are typically placed in separate cases which take up valuable counter space.

A typical roller grill, such as that disclosed in U.S. Pat. No. 7,520,211 is provided as a stand-alone unit, and ordinarily includes a cover that acts to retain heat and also acts to protect the products on the grill from outside contamination (i.e., a "sneeze guard"). A typical heated cabinet, such as that disclosed in U.S. Pat. No. 3,030,486 may include one or more flat shelves that may be provided inside a unit having several chambers, one chamber for each shelf; or the shelves may be provided in a single large chamber. However, it is not known that any existing hot food display device provides both a roller grill for cylindrical food items plus one or more shelves for flat items in the same unit. As a result, a hot food provider must purchase multiple merchandiser cases in order to display these different food product offerings.

A unit having a roller grill or other appliance combined with and one or more shelves in the same display unit would provide the advantages of conserving valuable counter space, and making new food combinations available for display and purchase. For example, pizza could be provided in the same unit with hot dogs, or burritos could be provided in the same unit with taquitos. In other non-limiting examples, combinations of meals and desserts, such as pastries and sausages could be made available from the same unit. It is therefore desirable to provide a single unit comprising a roller grill together with one or more warming shelves to conserve valuable retail counter space, and provide offerings of different food combinations from the same unit.

SUMMARY OF THE INVENTION

The present invention offers these and other advantages by providing single units that contain a large lower chamber, and one or more display shelves above this chamber on the inside of the unit. A roller grill or other large appliance may be provided in the lower chamber, or the chamber may be left open to display large food products or other items. Most embodiments of the present invention include one or more heated shelves for keeping foods displayed on the shelves warm; however, in other embodiments one or more of the shelves may not be heated for food products that do not need to be kept warm. The shelves may or may not be adjustable. Embodiments of the present invention allow store owners to utilize the space above a roller grill or other large appliance to merchandise additional food products as opposed to requiring a separate food merchandiser to occupy additional valuable counter space. Embodiments of the invention may improve the heating performance of the roller grill by speeding up the cook time of grilled products thereby reducing the potential for lost sales due to food not being sufficiently heated. The construction and operation of the different embodiments of the present invention are operable to accommodate changes in product offerings, giving the user increased flexibility in the use of merchandiser display cases.

Embodiments of the display units of the present invention may include a self-contained enclosure having one or more closable doors on the front of the enclosure, a large space at the bottom of the unit, and one or more shelves above the lower space. A roller grill or other appliance may be provided in the large lower space; or the space may be left open to display large food product or other items. It is to be appreciated that in alternative embodiments, one or more of the shelves may not be a warming shelf, and one or more of the shelves may be adjustable. Whether heated or not, the shelf immediately above the lower chamber serves to retain heat in this chamber, such that if a roller grill is deployed there, it is possible to cook foods at a faster rate. Once food on a roller grill is cooked, since heat is retained in the chamber above the roller grill, the amount of heat supplied to the chamber may be reduced from a cooking temperature to a maintenance temperature, saving resources.

In embodiments of the invention, the lowermost shelf above the lower chamber may be provided with one or more lights or lighting structures on its bottom surface. These lights may be used to illuminate the products in the chamber or on the optional roller grill. In some embodiments, the lights may also provide heat to the chamber or grill, which may further reduce cooking time for products on the grill, and may further conserve resources for maintaining such products at a desired temperature. In some embodiments, heating elements may be located on the bottom surface of the lowermost shelf to provide further heat to the lower chamber.

In embodiments of the invention, the lowermost shelf immediately above the lower chamber may be made of a thermally insulated material to help retain heat in the lower chamber, and prevent heat from exiting into other chambers of the unit. These embodiments allow for significantly different temperatures to be provided in the different chambers of these units. The one or more shelves above the lower chamber define additional chambers inside the unit. These shelves may or may not be provided with their own heating elements, and their positions may or may not be adjustable. In embodiments where such shelves are heated, the heat may be provided by foil heaters or other heating elements located underneath the top surface of the subject shelf. In addition, or in the alternative, heat may be provided from heating elements located on the bottom surface of the shelf (or ceiling) immediately above the subject shelf. In many of these embodiments, the heating elements of a given shelf may provide heat to the chamber below that shelf.

In some embodiments of the invention, one or more chambers may be formed above the lowermost shelf by adding additional shelves. These chambers may be separate from the bottom chamber below. In these embodiments, it is possible to provide chambers with different temperatures. For example and without limitation, if only one shelf is provided, the temperature in the bottom chamber below this shelf may be kept high in order to keep hot dogs warm on a roller grill, whereas the temperature in the chamber immediately above the bottom chamber may be kept lower (or may not be heated at all) in order to keep pastries on the shelf in this chamber warm without melting their icing. If a second shelf is provided above the lowermost shelf, this would provide a third chamber inside the unit. This second shelf may or may not be heated, and the third chamber including this shelf may be kept at a lower or higher temperature than either of the chambers below it. In addition, the bottom surface of this second shelf may include lights and/or heating elements which may provide illumination heat to the chamber below that shelf. A ceiling may also be provided above the uppermost shelf of the unit, and the ceiling may include lights and/or heating elements which may provide illumination heat to the chamber below it. It is to be appreciated that different combinations of temperatures may be provided in the chambers of different embodiments of the invention.

In embodiments of the invention, each shelf may be illuminated by one or more lights or lighting structures provided above the shelf. In some embodiments, the lights may also provide heat to the chamber that includes the shelf. The lights may be the sole source of heat for the shelf, or they may work in conjunction with heating elements above the shelf and heating elements in the shelf to maintain products on the shelf at a desired temperature.

It is to be appreciated that in other embodiments, the entire unit may comprise a single chamber such that heat from the lower chamber (e.g., from a roller grill) is allowed to travel upward to the products on the one or more shelves above the lower chamber. In these embodiments, the temperature of the different shelves will be affected by the heat of the lower chamber which naturally travels upward. The temperature of these one or more shelves may also be controlled using heating elements provided in, above or below the shelves themselves and/or by controlling lights that may be provided above or below the shelves.

One or more electronic controls may be provided to operate the heating elements of the one or more shelves, and/or the lights above the one or more shelves. One or more temperature sensors may also be provided in connection with each shelf or chamber of the unit. Each of the various heating elements may be separately controlled, and each of the lights may also be separately controlled, making it possible to adjust the heating elements and lights to achieve different temperatures in the different chambers and compartments of the display case.

In one aspect of the invention, a food merchandising display unit is provided that comprises a housing having a lower chamber located inside said housing at a bottom thereof, at least one food display shelf provided inside the housing above the lower chamber defining at least one upper chamber above the lower chamber, wherein an upper surface of the at least one shelf is located in the at least one upper chamber, and at least one light source located on a lower surface of said at least one shelf for providing one of illumination, heat and combinations thereof, to the chamber below said light source. In embodiments, the display unit may comprise at least one closable door on a front of said unit. In embodiments, the display unit may comprise at least one electronic heating element provided underneath the upper surface of at least one of said shelves for raising the temperature of said upper surface and the chamber above it. In embodiments, the display unit may comprise a ceiling above the uppermost chamber of said unit, said ceiling having at least one light source and at least one heating element located on a lower surface thereof. In embodiments, the display unit may include insulation provided on a lowermost shelf for maintaining the temperature in the lower chamber. In embodiments, the display unit may comprise at least one sensor provided in said lower chamber for detecting the temperature in said chamber and sending temperature information to an electronic control.

In another aspect of the invention, a food merchandising display unit is provided that comprises a roller grill provided inside the unit at the bottom thereof, said roller grill comprising a plurality of heated rollers for supporting and heating cylindrical food products, at least one food display shelf provided inside the unit above the roller grill defining a lower chamber that includes said roller grill and at least one upper chamber that includes an upper surface of said at least one shelf, and at least one electronic heating element provided underneath the upper surface of said at least one shelf for raising the temperature of said upper surface and said upper chamber. In embodiments, the display unit may comprise at least one closable door on a front of said unit. In embodiments, the display unit may comprise at least one light source provided on a lower surface of said lowermost shelf for providing one of illumination, heat and combinations thereof to said lower chamber. In embodiments, the display unit may comprise at least one sensor provided in each of said chambers for detecting the temperature in said chamber and sending temperature information to an electronic control. In embodiments, the display unit may comprise a ceiling above the uppermost chamber of said unit, said ceiling having at least one light source and at least one heating element located on a lower surface thereof. In embodiments, the display unit may include insulation provided on said lowermost shelf for maintaining the temperature in the lower chamber. In embodiments, the display unit may comprise a ceiling above the uppermost chamber of said unit, said ceiling having at least one light source and at least one heating element located on a lower surface thereof.

It is therefore an object of the present invention to provide a food merchandising display unit that includes both a roller grill for cooking and displaying cylindrical food products, and at least one shelf above the roller grill for displaying other food products.

It is also an object of the present invention to provide a food merchandising display unit that includes a large lower chamber into which a roller grill or other appliance may optionally be deployed, and at least one shelf above the lower chamber for displaying other food products.

It is also an object of the present invention to provide a food merchandising display unit that includes a lower roller grill and one or more shelves above the roller grill in which one or more of the shelves are separately heated.

It is also an object of the present invention to provide a food merchandising display unit that includes a lower roller grill and one or more shelves above the roller grill in which the roller grill and one or more of the shelves are separately lighted.

It is also an object of the present invention to provide a food merchandising display unit that includes a large lower chamber and one or more upper chambers in which the temperature inside each chamber may be separately controlled using combinations of shelf heating elements, overhead heating elements, lights, sensor and electronic controls.

Additional aspects and objects of the invention will be apparent from the detailed descriptions and the claims herein.

The present invention provides shelf adjustment systems and methods that are operable to be used in merchandiser display cases and other applications, and overcome many of the disadvantages and shortcomings associated with known merchandiser display constructions. The construction and operation of the heating systems of embodiments of the present invention are operable to accommodate changes in product offerings, giving the user increased flexibility in the use of merchandiser display cases.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Figure 1:
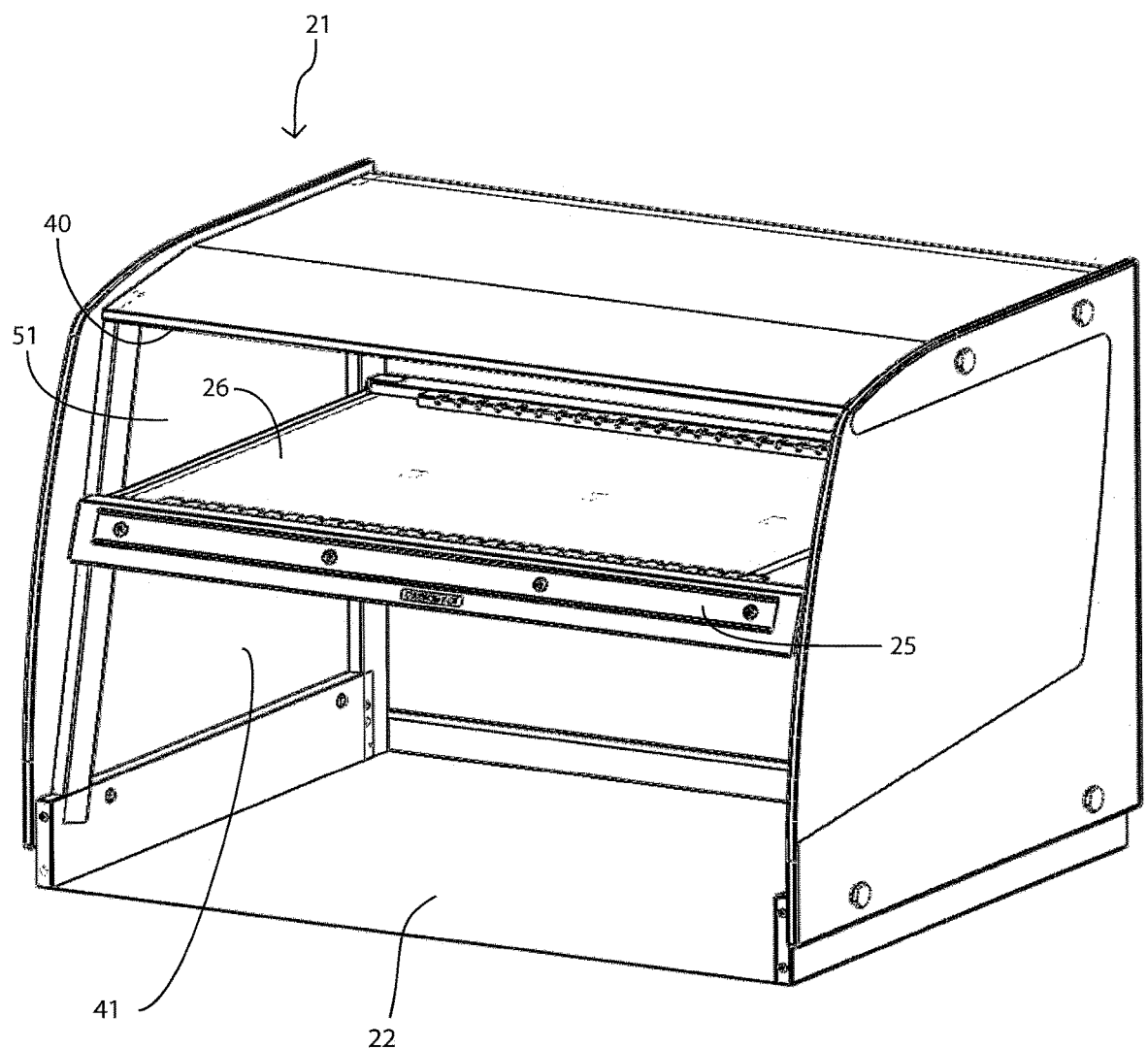
FIG. 1 is a front perspective view of a merchandiser display case of an embodiment of the present invention.
Figure 2:
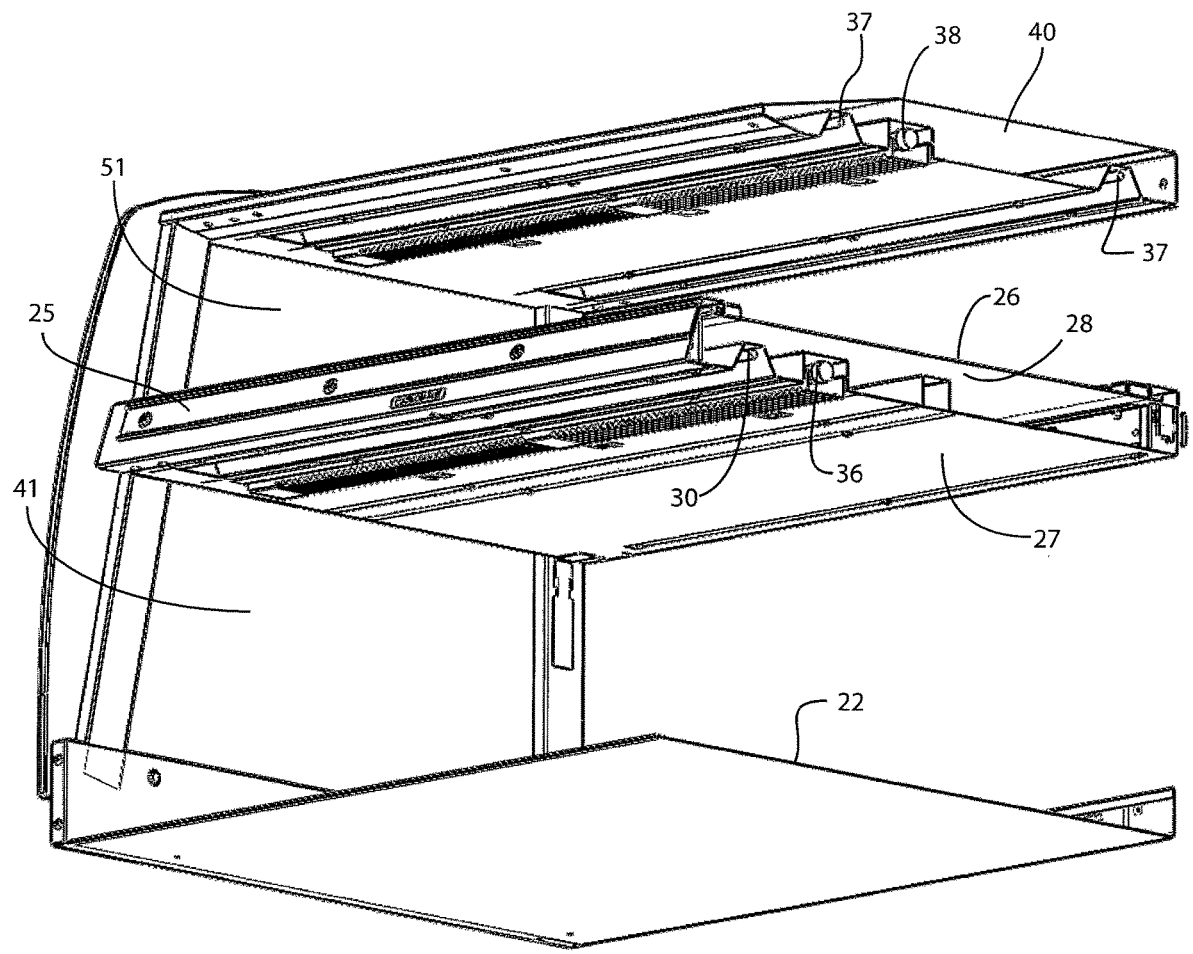
FIG. 2 is a front sectional view of the merchandiser display case of FIG. 1.
Figure 3:
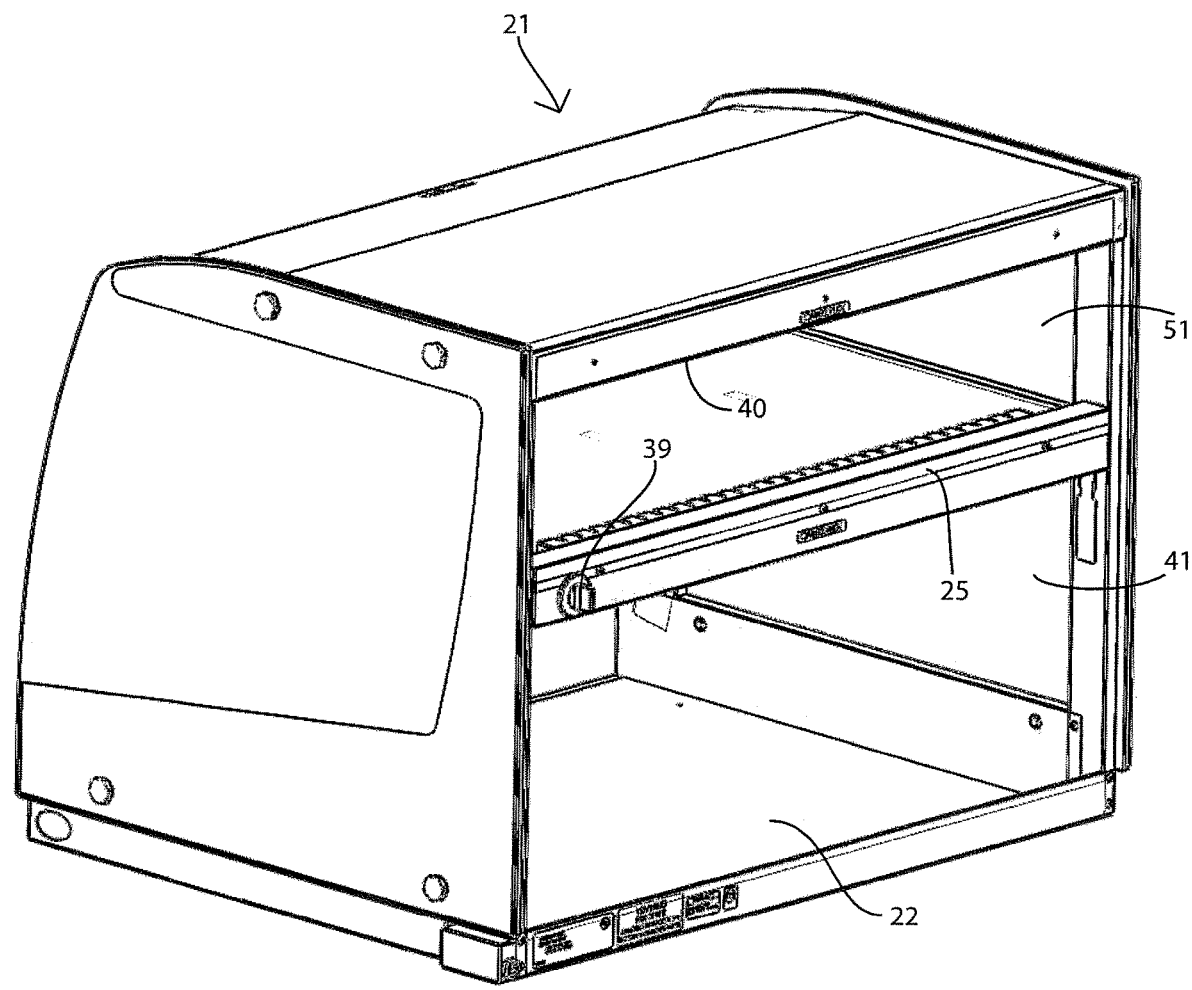
FIG. 3 is a rear perspective view of the merchandiser display case of FIG. 1.

Referring to the drawings wherein like reference characters designate like or corresponding parts throughout the several views, and referring particularly to FIGS. 1-3, it is seen that the embodiments of the invention shown in these illustrations include a food merchandiser 21 having a housing comprising a lower chamber 41 and a single upper shelf 25 and an upper chamber 51. It is to be understood that the lower chamber and shelf combination may be implemented in other apparatus, and that additional shelves and additional chambers may be provided in other embodiments. FIG. 1 provides a front perspective view of an exemplary merchandiser display case 21 having an opening through which food items may be displayed on the shelves therein. In some embodiments, at least one closable door may be provided on the front of the unit.

A lower chamber 41 is provided inside the display case housing having a base or floor 22 which may be used to hold or display large food products or other items. As noted in alternative embodiments below, a roller grill or other appliance may be optionally deployed in chamber 41. A first shelf 25, the position of which may or may not be adjusted, may be provided above the lower chamber 41, defining an upper chamber 51 above shelf 25. Shelf 25 may be sealingly engaged with the sides, back and window of the display unit. Shelf 25 may be insulated in order to help prevent heat from escaping from the lower chamber 41 into other chambers inside the housing.

One or more temperature sensors (not shown) may be provided in the lower chamber 41 to monitor the temperature of this chamber, and to provide that information to the electronic control unit 34. One or more lights 36 may be provided on the underside 27 of shelf 25 to illuminate food items in chamber 41. These lights may also provide heat to the lower chamber 41. One or more heating elements 30 may optionally be provided on the underside 27 of shelf 25 to provide additional heat to the lower chamber. By controlling the lights 36, and adjusting the temperature of the optional heating elements 30, the temperature inside the lower chamber 41 may be changed as desired.

Shelf 25 may or may not be heated. If heated, heat may be provided to shelf 25 through one or more heating elements 28 provided below an upper surface 26 of shelf 25 as shown in FIG. 2. Heating elements 28 may be in the form of foil elements, electric rods, coils or other heating structures, and may be controlled electronically using a control 39 which may be located on the back of the display case 21. One or more temperature sensors (not shown) may be provided in the upper shelf chamber 51 to monitor the temperature of this chamber, and to provide that information to the electronic control unit. In most embodiments, a ceiling 40 is also provided above the uppermost chamber of the housing (e.g., chamber 51 in the illustrated embodiments). The ceiling may include lights 38 and heating elements (e.g., rods, coils, etc.) 37 on a lower surface thereof to provide illumination and/or heat to the chamber below (e.g. chamber 51).

In embodiments where the lower shelf 25 is sealingly engaged with the front, back and sides of the display case 21, a separate upper chamber 51 is formed that includes the upper surface 26 of shelf 25. This chamber 51 may be maintained at a different temperature than the lower chamber 41, and this temperature may be adjusted by adjusting the heating elements 28 (if provided) or the lights 38 (if provided).

In alternative embodiments, shelf 25 may not be sealingly engaged with the front, back and sides of the display case 21. In these embodiments, heat generated in the lower chamber may travel into the area around and above shelf 25 and may affect the temperature of food products located on surface 26. In these embodiments, adjusting the temperature of the lower chamber and/or adjusting the heating 28 of shelf 25 (if provided), and adjusting the lights 38 and/or any heating elements 37 in the ceiling 40 may be used to control the temperature of products on the shelf 26.

Figure 4:
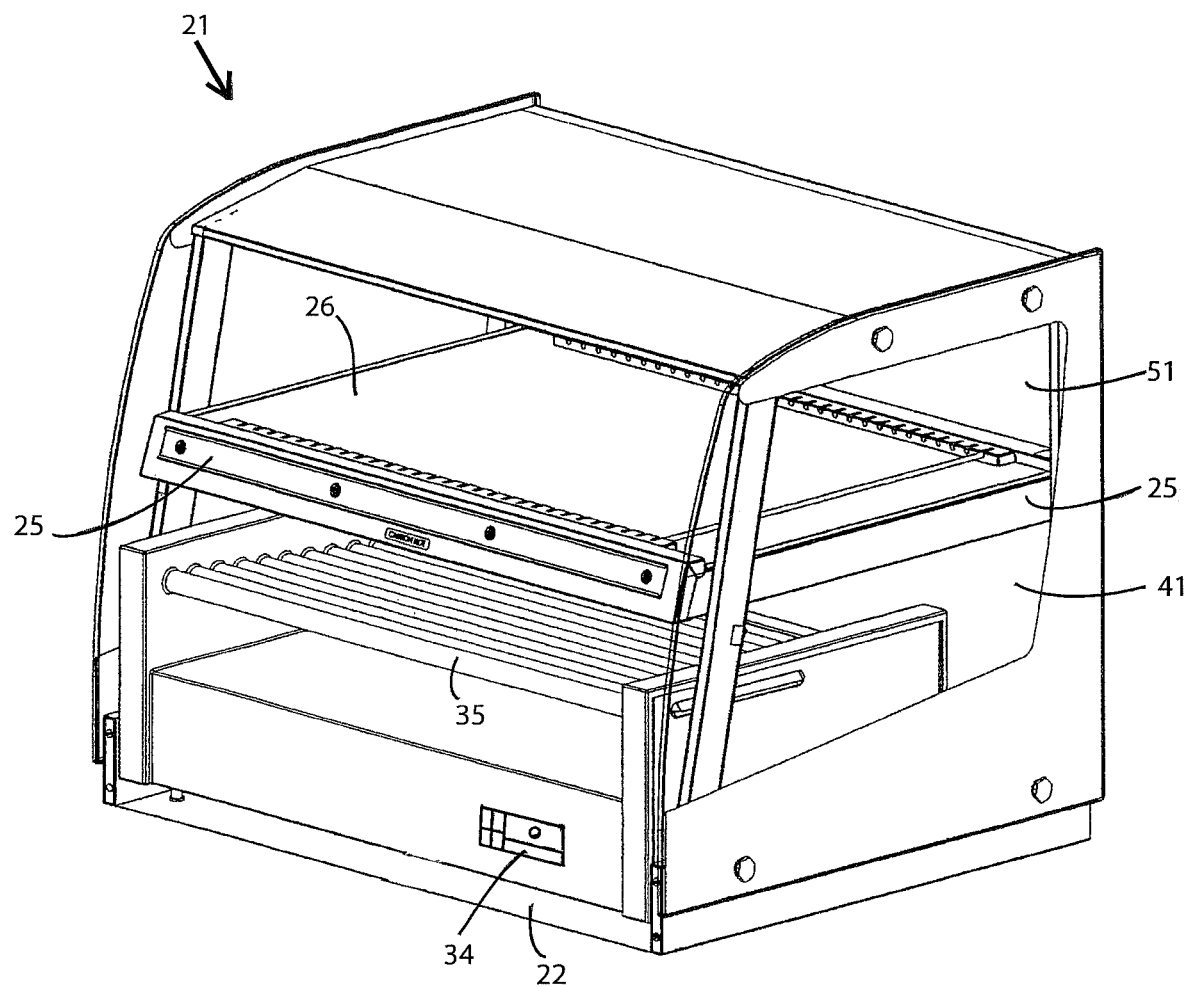
FIG. 4 is a front perspective view of a merchandiser display case of an embodiment of the present invention.
Figure 5:
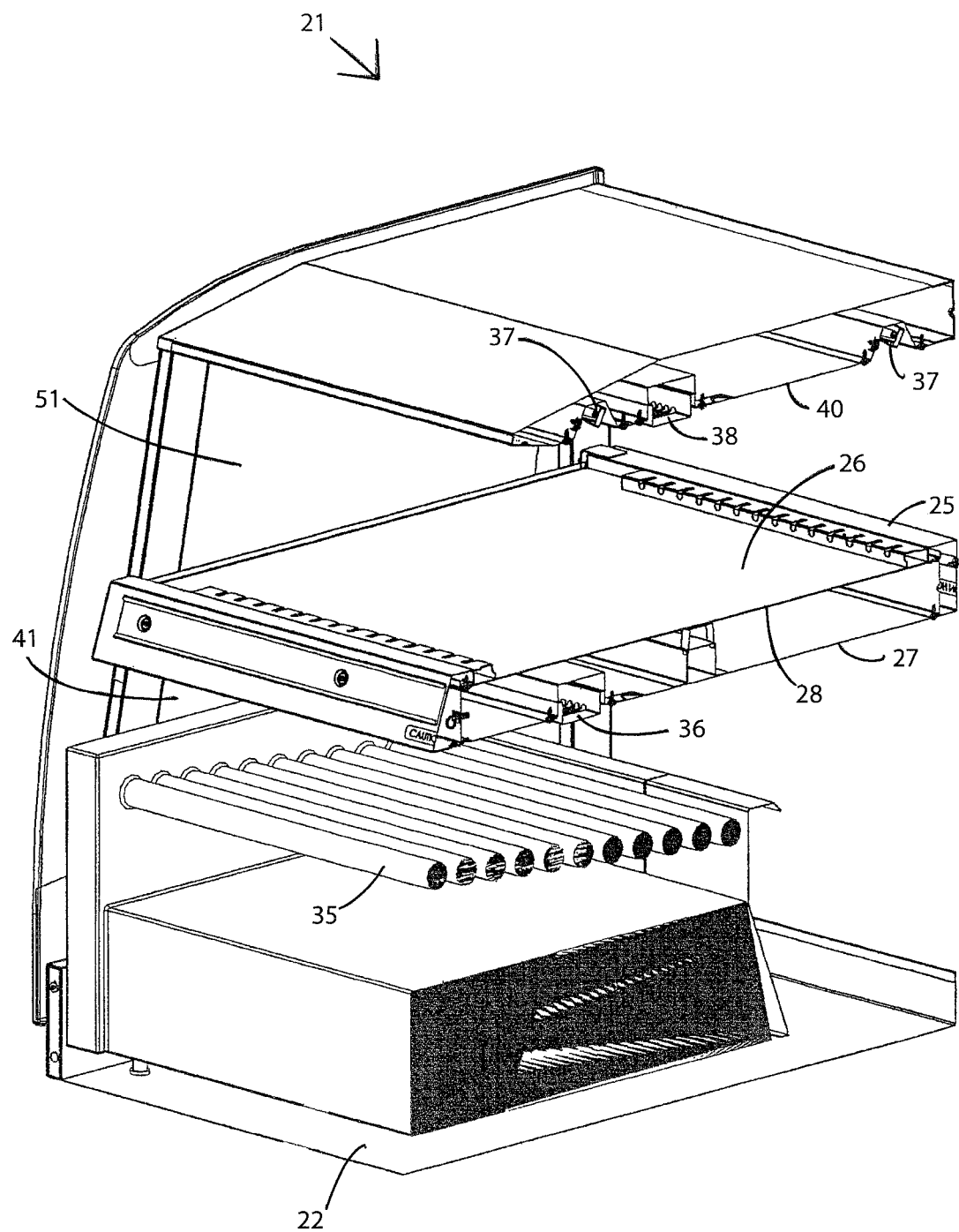
FIG. 5 is a front sectional view of the merchandiser display case of FIG. 4
Figure 6:
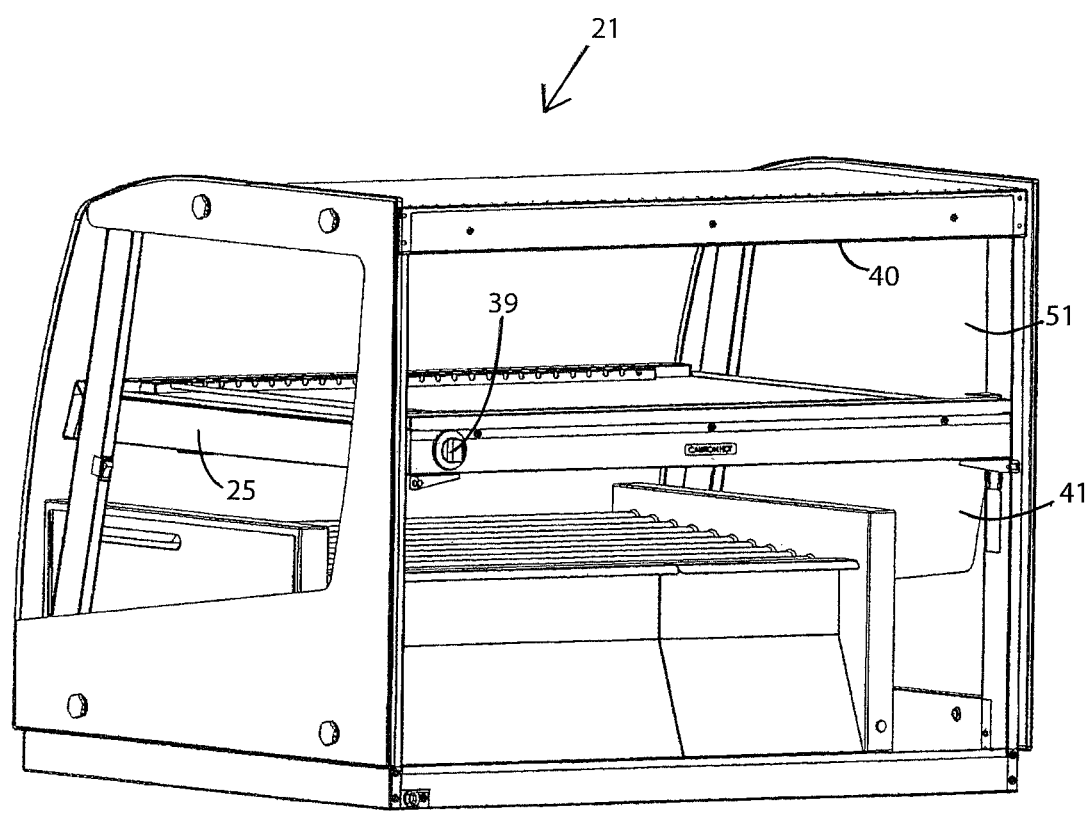
FIG. 6 is a rear perspective view of the merchandiser display case of FIG. 4.

An alternative embodiment is shown in FIGS. 4-6 which provide views of an exemplary embodiment of a food merchandiser of the present invention, wherein a lower roller grill and a single upper shelf are provided. It is to be understood that the roller grill and shelf combination may be implemented in other apparatus, and that additional shelves and additional chambers may be provided in other embodiments. FIG. 4 provides a front perspective view of an exemplary merchandiser display case 21 having an opening through which food items may be displayed on the shelves therein. In some embodiments, at least one closable door may be provided on the front of the unit.

A lower roller grill is provided inside the display case 21 which may include a plurality of rotatable heated rollers 35 upon which hot dogs or other cylindrical food items may be placed for cooking and warming. The heated rollers 35 may be operated using an electronic control 34. A first adjustable shelf 25 may be provided above the roller grill. Shelf 25 may be sealingly engaged with the sides, back and windows (if present) of the display unit to create a lower chamber 41 surrounding the roller grill. Shelf 25 may be insulated in order to help prevent heat from escaping from the lower chamber 41.

One or more temperature sensors (not shown) may be provided in the roller grill chamber 41 to monitor the temperature of this chamber, and to provide that information to the electronic control unit 34. One or more lights 36 may be provided on the underside 27 of shelf 25 to illuminate food items on the rollers 35. The lights may also provide heat to the lower chamber 41. One or more optional heating elements 30 may also be provided on the underside 27 of shelf 25 to heat food items on the rollers 35. By adjusting the temperature of the heated rollers 35, the optional heating elements 30, and by controlling the lights 36, the temperature inside the lower chamber 41 may be changed as desired.

Shelf 25 may or may not be heated. If heated, heat may be provided to shelf 25 through one or more heating elements 28 provided below an upper surface 26 of shelf 25 as shown in FIG. 5. Heating elements 28 may be in the form of foil elements, electric coils, rods or other heating structures, and may be controlled electronically using a control 39 which may be located on the back of the display case 21. One or more temperature sensors (not shown) may be provided in the upper shelf chamber 51 to monitor the temperature of this chamber, and to provide that information to the electronic control unit. In most embodiments, a ceiling 40 is also provided above the uppermost chamber of the housing (e.g., chamber 51 in the illustrated embodiments). The ceiling may include lights 38 and heating elements 37 on a lower surface thereof to provide illumination and/or heat to the chamber below (e.g. chamber 51).

In embodiments where the lower shelf 25 is sealingly engaged with the front, back and sides of the display case 21, a separate upper chamber 51 is formed that includes the upper surface 26 of shelf 25. This chamber 51 may be maintained at a different temperature than the lower chamber 41 containing the roller grill, and may be adjusted by adjusting the heating elements 28 (if provided), or the ceiling heating elements 37 (if provided), or the ceiling lights 38 (if provided).

In alternative embodiments, shelf 25 may not be sealingly engaged with the front, back and sides of the display case 21. In these embodiments, heat generated by the roller grill heater may travel into the area around and above shelf 25 and may affect the temperature of food products located on surface 26. In these embodiments, in addition to the heating elements available in upper chamber 51, adjusting the temperature of the grill and/or adjusting the heating of other elements in the lower chamber 41 may also be used to control the temperature of products on the shelf 26.

By way of example and without limitation, a plurality of cylindrical heated food products such as hot dogs may be deposited on rollers 35 of a roller grill of an embodiment of the invention, and heat and rotation may be supplied to the rollers. This will raise the temperature in lower chamber 41. If ambient light is not sufficient, lights 36 may be provided to illuminate the hot dogs or other food products, and to provide additional heat to chamber 41 if desired. Heat may also be provided to chamber 41 using optional heating elements 30 on the underside of shelf 25. Thus, the temperature of chamber 41 may be controlled by adjusting the heat of the roller grill, adjusting the lights 36 and adjusting the heating elements 30 in shelf 25.

In some embodiments of the above example, other heated food products such as pizza or burritos may be provided on surface 26 of warming shelf 25. In embodiments where the grill is in a separate chamber 41 from the warming shelf chamber 51, the heating elements 28 of shelf 25 may be used to control the temperature of the upper chamber 51 including surface 26 of shelf 25. If ambient light is not sufficient, upper lights 38 may be provided to illuminate the pizza or burritos, and to provide additional heat to chamber 51 if desired. Additional heat may also be provided to chamber 51 using heating elements 37 on the underside of the ceiling 40. The temperature of chamber 51 may be controlled by adjusting the heat of the shelf 25, adjusting heating elements 37, and adjusting the lights 38. In embodiments where chambers 41 and 51 are not separated, the temperature of surface 26 may be adjusted using not only the heating structures of shelf 25, the ceiling heating elements 37 and the upper lights 38, but also by adjusting the heat generated by the roller grill and/or the lower lights 36 and/or the optional lower heating elements 30.

In other embodiments of the above example, non-heated food products such as pastries with icing may be provided on surface 26 of shelf 25. In these embodiments, shelf 25 has no heating elements. Upper lights 38 may be used to illuminate the pastries, but care must be taken so that lights 38 do not generate excessive heat that might melt the icing or otherwise affect the non-heated food products. In embodiments where chambers 41 and 51 are not separated, care must be taken to prevent the temperature of surface 26 from climbing too high as a result of the heat generated by the roller grill, the lower lights 36 or the optional lower heating elements 30.

It should also be understood that the foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A food merchandising display unit comprising:
   a. a housing having at least one opening at a front thereof;
   b. a lower chamber located inside said housing at a bottom thereof;
   c. at least one food display shelf provided inside the housing above the lower chamber defining at least one upper chamber above the lower chamber, wherein an upper surface of at least one shelf is located in the at least one upper chamber; and d. a roller grill located in said lower chamber, said roller grill comprising a plurality of heated rollers for supporting and heating cylindrical food products.

2. The display unit of claim 1 further comprising at least one electronic heating element provided underneath the upper surface of said at least one shelf for raising the temperature of said upper surface and the chamber above it.

3. The display unit of claim 1 further comprising a ceiling above the uppermost chamber of said unit, said ceiling having at least one light source and at least one heating element located on a lower surface thereof.

4. The display unit of claim 1 further comprising at least one heating element provided on a lower surface of a lowermost shelf for providing heat to said lower chamber.

5. The display unit of claim 1 wherein insulation is provided on a lowermost shelf for maintaining the temperature in the upper chamber.

6. The display unit of claim 1 further comprising at least one sensor provided in said upper chamber for detecting the temperature in said chamber and sending temperature information to an electronic control.

7. The display unit of claim 1 further comprising at least one closable door on a front of said unit.

8. The display unit of claim 1 further comprising at least one light source located on a lower surface of said at least one shelf for providing one of illumination, heat and combinations thereof, to the chamber below said light source.

9. A food merchandising display unit comprising:
a. a roller grill provided inside the unit at a bottom thereof, said roller grill comprising a plurality of heated rollers for supporting and heating cylindrical food products;
b. at least one food display shelf provided inside the unit above the roller grill defining a lower chamber that includes said roller grill and at least one upper chamber that includes an upper surface of said at least one shelf; and
c. at least one electronic heating element provided underneath the upper surface of said at least one shelf for raising the temperature of said upper surface and said upper chamber.

10. The display unit of claim 9 further comprising at least one light source provided on a lower surface of a lowermost shelf for providing one of illumination, heat and combinations thereof to said lower chamber.

11. The display unit of claim 9 further comprising at least one heating element provided on a lower surface of a lowermost shelf for providing heat to said lower chamber.

12. The display unit of claim 9 further comprising a ceiling above the uppermost chamber of said unit, said ceiling having at least one light source and at least one heating element located on a lower surface thereof.

13. The display unit of claim 9 further comprising at least one sensor provided in said upper chamber for detecting the temperature in said chamber and sending temperature information to an electronic control.

14. The display unit of claim 9 wherein insulation is provided on a lowermost shelf for maintaining the temperature in the upper chamber.

15. The display unit of claim 9 further comprising at least one closable door on a front of said unit.

16. A method of displaying warm food comprising the steps of:
a. depositing at least one cylindrical food product onto heated rollers of a roller grill provided inside a lower chamber of a merchandising display unit;
b. depositing at least one non-cylindrical food product on a food display shelf provided in an upper chamber above said roller grill inside said display unit;
c. activating said roller grill to raise the temperature of said at least one cylindrical food product and said lower chamber; and
d. activating at least one first heating element located underneath an upper surface of said shelf to raise the temperature of said shelf and the at least one non-cylindrical food product thereon.

17. The method of claim 16 comprising the additional steps of:
e. activating at least one second heating element located above said lower chamber to raise the temperature of said lower chamber; and
f. activating at least one third heating element located above said upper chamber to raise the temperature of said upper chamber.

18. The method of claim 16 comprising the additional steps of:
e. activating at least one first light source located above said lower chamber to illuminate and raise the temperature of said lower chamber; and
f. activating at least one second light source located above said upper chamber to illuminate and raise the temperature of said upper chamber.

* * * * *